(12) United States Patent
Choi et al.

(10) Patent No.: US 8,165,304 B2
(45) Date of Patent: Apr. 24, 2012

(54) DOMAIN DIGITAL RIGHTS MANAGEMENT SYSTEM, LICENSE SHARING METHOD FOR DOMAIN DIGITAL RIGHTS MANAGEMENT SYSTEM, AND LICENSE SERVER

(75) Inventors: Dong Hyun Choi, Seoul (KR); Yun Ho Lee, Seoul (KR); Seung Joo Kim, Seoul (KR); Dong Ho Won, Seoul (KR)

(73) Assignee: Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 1041 days.

(21) Appl. No.: 12/032,825

(22) Filed: Feb. 18, 2008

(65) Prior Publication Data
US 2009/0208016 A1 Aug. 20, 2009

(51) Int. Cl.
*H04L 9/00* (2006.01)
(52) U.S. Cl. .......... 380/277; 705/57; 705/71; 713/171; 380/200; 380/201; 380/203; 380/210; 380/278; 726/31; 726/32
(58) Field of Classification Search .............. 380/277, 380/200, 201, 203, 210, 278; 705/57, 71; 713/171; 726/31, 32
See application file for complete search history.

(56) References Cited

U.S. PATENT DOCUMENTS

| | | | |
|---|---|---|---|
| 6,587,945 B1 * | 7/2003 | Pasieka ..................... | 713/176 |
| 2004/0088541 A1 * | 5/2004 | Messerges et al. .......... | 713/156 |
| 2007/0011459 A1 * | 1/2007 | Stapleton et al. ........... | 713/178 |
| 2007/0180519 A1 * | 8/2007 | Boccon-Gibod et al. ...... | 726/21 |
| 2008/0184350 A1 * | 7/2008 | Chu ........................... | 726/7 |
| 2008/0313264 A1 * | 12/2008 | Pestoni ...................... | 709/202 |
| 2009/0265556 A1 * | 10/2009 | Lee ............................ | 713/169 |

OTHER PUBLICATIONS

Hsing-Bai Chen; Efficient and Portable Digital Rights Management for Preserving User Privacy Using Smart Card; Oct. 2007, pp. 1-10.*

* cited by examiner

*Primary Examiner* — April Shan
(74) *Attorney, Agent, or Firm* — RatnerPrestia

(57) ABSTRACT

Disclosed is a domain DRM system, a license sharing method for the domain DRM system, and a license server. The domain DRM system includes at least one domain including at least one user module adapted for encryption or decryption using a provided encryption key and a domain manager adapted for decryption using a provided encryption key, and a license server for creating encryption keys corresponding to the domain manager and the one user module, respectively, and providing them with the created contents, respectively, so that, when at least one user module requests contents, a contents encryption key used to encrypt the contents is encrypted by using an encryption key of the user module and an encryption key of the domain manager according to a commutative encryption scheme, and one of the domain manager and the user module is provided with a shared license obtained as a result of encryption.

30 Claims, 5 Drawing Sheets

DOMAIN DIGITAL RIGHTS MANAGEMENT SYSTEM, LICENSE SHARING METHOD FOR DOMAIN DIGITAL RIGHTS MANAGEMENT SYSTEM, AND LICENSE SERVER

FIELD OF THE INVENTION

The present invention relates to a domain DRM (Digital Rights Management) system, and more particularly to a domain DRM system for enabling users to freely use contents within the authorized domain while efficiently protecting the right of the copyright holder of the contents, a license sharing method for the domain DRM system, and a license server.

DESCRIPTION OF THE PRIOR ART

As digital contents are extensively used in a large amount, DRM technology has appeared to prohibit the unauthorized use of digital contents and protect the rights and interests of copyright holders.

Current DRM technology tends to excessively focus on limiting the illegal use of contents. In other words, the technology has been designed so that user modules (e.g. PCs, PDAs, DVD players) that have initially purchased contents can solely use the contents. This means that, when a user has purchased contents by using his/her PC, he/she cannot transfer the contents to his/her own PDA to use them on the move, because the current DRM technology does not support this. As such, the current DRM technology is excessively focusing on limiting the illegal use of contents, and may even restrict the user's legitimate right. It would be preferable to allow users to freely use their own contents within the boundary of personal copying.

In an attempt to solve the problem of limitations on the user's right, AD (Authorized Domain) DRM technology has been proposed. This technology allows user modules in the authorized domain to freely share contents. Particularly, when a user has purchased contents by using his/her PC, he/she can move the contents to his/her own PDA and use them on the move. As used herein, a domain refers to a network of user modules (e.g. PCs, PDAs, DVD players) capable of playing contents, such as a home network.

However, the AD DRM technology has a problem in that, although it allows users to use contents in the authorized domain more freely than conventional DRM systems, a considerable amount of resources are wasted to maintain a certificate revocation mechanism, which is necessary for user modules in the domain to unsubscribe. Furthermore, users can sill use the existing contents outside the authorized domain.

SUMMARY OF THE INVENTION

Accordingly, the present invention has been made to solve the above-mentioned problems occurring in the prior art, and the present invention provides a domain DRM system including at least one domain including at least one user module adapted for encryption or decryption using a provided encryption key and a domain manager adapted for decryption using a provided encryption key; and a license server for creating encryption keys corresponding to the domain manager and at least one user module, respectively, and providing the domain manager and at least one user module with the created contents, respectively, so that, when at least one user module requests contents, a contents encryption key used to encrypt the contents is encrypted by using an encryption key of the user module and an encryption key of the domain manager according to a commutative encryption scheme, and one of the domain manager and the user module is provided with a shared license obtained as a result of encryption.

The present invention also provides a method for sharing a license for a domain DRM system, the method including the steps of creating encryption keys corresponding to a domain manager and at least one user module, respectively, and providing the domain manager and at least one user module with corresponding encryption keys by a license server, respectively; receiving a request for contents from a first module of the user modules and encrypting a contents encryption key in response to the request, the contents encryption key having been used to encrypt the contents, by using the encryption keys corresponding to the first module and the domain manager, respectively, according to a commutative encryption scheme by the license server; and providing one of the domain manager and the first module with a shared license as a result of encryption by the license server.

The present invention also provides a license server including an encryption key creation module for creating encryption keys corresponding to a domain manager and at least one user module belonging to a domain, respectively; an encryption module for encrypting a contents encryption key used to encrypt contents requested by a first module of the user modules by using the encryption keys corresponding to the first module and the domain manager, respectively, according to a commutative encryption scheme; and a communication module for transmitting the encryption keys created by the encryption key creation module to the domain manager and at least one user module, respectively, and providing one of the domain manager and the first module with a shared license as a result of encryption by the encryption module.

In accordance with an aspect of the present invention, there is provided a domain DRM system including at least one domain including at least one user module adapted for encryption or decryption using a provided encryption key and a domain manager adapted for decryption using a provided encryption key; and a license server for creating encryption keys corresponding to the domain manager and at least one user module, respectively, and providing the domain manager and at least one user module with the created contents, respectively, so that, when at least one user module requests contents, a contents encryption key used to encrypt the contents is encrypted by using an encryption key of the user module and an encryption key of the domain manager according to a commutative encryption scheme, and one of the domain manager and the user module is provided with a shared license obtained as a result of encryption.

Preferably, the license server is adapted to provide the domain manager with a server certificate for mutual authentication between the domain manager and the license server, when the domain manager provides the license server with a domain certificate in response to a registration request of the domain manager.

Preferably, the domain manager is adapted to provide the license server with at least one selected from the group consisting of a domain ID of the domain, the domain manager belonging to the domain, a user module list enumerating a module ID of at least one user module belonging to the domain, a public key of each user module, and a public key of the domain manager when the mutual authentication is completed.

Preferably, at least one user module is adapted to transmit the module ID of the user module, the public key allocated to the user module in advance, and a module certificate of the user module to the domain manager so that the user module is registered in the domain, the domain manager belonging to the domain.

Preferably, the license server is adapted to create encryption keys corresponding to the domain manager and at least one user module, respectively, encrypt the encryption keys corresponding to the domain manager and at least one user module by using corresponding public keys, respectively, and provide the domain manager and at least one user module with the corresponding encrypted encryption keys, respectively.

Preferably, the license server includes an encryption key creation module for creating encryption keys corresponding to the domain manager and at least one user module, respectively, and an encryption module for encrypting a contents encryption key used to encrypt contents requested by a first module of the user modules by using the encryption keys corresponding to the first module and the domain manager, respectively, according to the commutative encryption scheme.

Preferably, the shared license is encrypted by the encryption module according to the commutative encryption scheme as defined by equation $$CE_{K1}(CE_{K2}(M)) = CE_{K2}(CE_{K1}(M))$$

wherein, $CE_K(M)$ refers to encryption of data M by an encryption key K, and $CE_{K1}(CE_{K2}(M))$ means that the data M is encrypted by an encryption key K2 and is again encrypted by an encryption key K1.

Preferably, the first module is adapted to provide the domain manager with the shared license when the license server provides the first module with the shared license.

Preferably, the domain manager includes a decryption module for decrypting the shared license by using the encryption key provided by the license server, when the domain manager is provided with the shared license, so that the first module is provided with the decrypted shared license.

Preferably, the first module includes an encryption/decryption module for decrypting the decrypted shared license by using the encryption key provided by the license server, when the domain manager provides the first module with decrypted shared license, so that the contents encryption key used to encrypt the contents can be obtained from the shared license.

Preferably, the first module is adapted to decrypt the shared license provided by the license server by using the encryption key provided by the license server and provide a second module with the decrypted shared license, when the second module in the domain requests that the shared license be shared.

Preferably, the second module is adapted to encrypt the decrypted shared license by using the encryption key provided by the license server and provide the domain manager with the encrypted shared license, when the first module provides the second module with the decrypted shared license.

Preferably, the domain manager further includes a stamp/signature module for creating a shared license concatenated with a time stamp by concatenating the shared license decrypted by the decryption module with a time stamp corresponding a current time value, creating an electronic signature value by hashing the shared license concatenated with the time stamp and electronically signing a resulting hash value, and providing the first module with the shared license concatenated with the time stamp and the electronic signature value.

Preferably, the first module further includes a legitimacy determination module for determining if the electronic signature value corresponds to the domain manager, if a value obtained by hashing the shared license concatenated with the time stamp by using the public key of the domain manager equals the electronically signed hash value, and if a difference between a value of the time stamp and current time is below a predetermined threshold, when the domain manager provides the first module with the shared license concatenated with the time stamp and the electronic signature value.

Preferably, the first module is adapted to remove the time stamp from the shared license concatenated with the time stamp by using the encryption/decryption module, decrypt the shared license by using the encryption key provided by the license server, and obtain the contents encryption key from the shared license, when it is determined that the electronic signature value corresponds to the domain manager, that the value obtained by hashing the shared license concatenated with the time stamp by using the public key of the domain manager equals the electronically signed hash value, and that the difference between the value of the time stamp and current time is below the predetermined threshold.

In accordance with another aspect of the present invention, there is provided a method for sharing a license for a domain DRM system, the method including the steps of creating encryption keys corresponding to a domain manager and at least one user module, respectively, and providing the domain manager and at least one user module with corresponding encryption keys by a license server, respectively; receiving a request for contents from a first module of the user modules and encrypting a contents encryption key in response to the request, the contents encryption key having been used to encrypt the contents, by using the encryption keys corresponding to the first module and the domain manager, respectively, according to a commutative encryption scheme by the license server; and providing one of the domain manager and the first module with a shared license as a result of encryption by the license server.

Preferably, the method further includes a step of providing the domain manager with a server certificate of the license server for mutual authentication between the domain manager and the license server, when the domain manager provides the license server with a domain certificate in response to a registration request of the domain manager.

Preferably, the method further includes a step of providing the license server with at least one selected from the group consisting of a domain ID of the domain, the domain manager belonging to the domain, a user module list enumerating a module ID of at least one user module belonging to the domain, a public key of each user module, and a public key of the domain manager when the mutual authentication is completed.

Preferably, the method further includes a step of transmitting the module ID of at least one user module, the public key allocated to the user module in advance, and a module certificate of the user module to the domain manager by the user module so that the user module is registered in the domain, the domain manager belonging to the domain.

Preferably, the step of creating and providing respective encryption keys includes the steps of creating encryption keys corresponding to the domain manager and at least one user module, respectively; encrypting the encryption keys corresponding to the domain manager and at least one user module, respectively, by using corresponding public keys; and providing the domain manager and at least one user module with the corresponding encrypted encryption keys, respectively.

Preferably, the shared license is encrypted according to the commutative encryption scheme as defined by equation $$CE_{K1}(CE_{K2}(M))=CE_{K2}(CE_{K1}(M))$$

wherein, $CE_K(M)$ refers to encryption of data M by an encryption key K, and $CE_{K1}(CE_{K2}(M))$ means that the data M is encrypted by an encryption key K2 and is again encrypted by an encryption key K1.

Preferably, the method further includes a step of providing the domain manager with the shared license by the first module when the license server provides the shared license.

Preferably, the method further includes a step of decrypting the shared license by using the encryption key provided by the license server, when the shared license is provided, and providing the first module with the decrypted shared license by the domain manager.

Preferably, the method further includes a step of decrypting the decrypted shared license by using the encryption key provided by the license server, when the domain manager provides the decrypted shared license, and obtaining the contents encryption key by the first module.

Preferably, the method further includes a step of decrypting the shard license by using the encryption key provided by the license server, when a second module in the domain requests that the shared license be shared, and providing the second module with the decrypted shared license by the first module.

Preferably, the method further includes a step of encrypting the decrypted shared license by using the encryption key provided by the license server, when the first module provides the decrypted shared license, and providing the domain manager with the encrypted shared license by the second module.

Preferably, the step of providing the first module with the decrypted shared license includes the steps of decrypting the shared license by using the encryption key provided by the license server by the domain manager; concatenating the decrypted shared license with a time stamp corresponding to a current time value; creating an electronic signature value by hashing the shared license concatenated with the time stamp and electronically signing a resulting hash value; and providing the first module with the shared license concatenated with the time stamp and the electronic signature value.

Preferably, the step of decrypting the shared license by the first module includes the steps of determining if the electronic signature value corresponds to the domain manager, if a value obtained by hashing the shared license concatenated with the time stamp by using a public key of the domain manager equals the electronically signed hash value, and if a difference between a value of the time stamp and current time is below a predetermined threshold, when the shared license concatenated with the time stamp and the electronic signature value are provided; removing the time stamp from the shared license concatenated with the time stamp when it is determined that the electronic signature value corresponds to the domain manager, that the value obtained by hashing the shared license concatenated with the time stamp by using the public key of the domain manager equals the electronically signed hash value, and that the difference between the value of the time stamp and current time is below the predetermined threshold; and decrypting the shared license by using the encryption key provided by the license server.

In accordance with another aspect of the present invention, there is provided a license server including an encryption key creation module for creating encryption keys corresponding to a domain manager and at least one user module belonging to a domain, respectively; an encryption module for encrypting a contents encryption key used to encrypt contents requested by a first module of the user modules by using the encryption keys corresponding to the first module and the domain manager, respectively, according to a commutative encryption scheme; and a communication module for transmitting the encryption keys created by the encryption key creation module to the domain manager and at least one user module, respectively, and providing one of the domain manager and the first module with a shared license as a result of encryption by the encryption module.

Preferably, the shared license is encrypted by the encryption module according to the commutative encryption scheme as defined by equation $$CE_{K1}(CE_{K2}(M))=CE_{K2}(CE_{K1}(M))$$

wherein, $CE_K(M)$ refers to encryption of data M by an encryption key K, and $CE_{K1}(CE_{K2}(M))$ means that the data M is encrypted by an encryption key K2 and is again encrypted by an encryption key K1.

The domain DRM system, the license sharing method for the domain DRM, and the license server according to the present invention are advantageous in that a shared license is encrypted twice according to the commutative encryption scheme and is freely shared between user modules in the domain so that purchased contents can be freely used between user modules in the domain within the boundary of personal copying. When a user module moves away from the domain, the use of contents is limited. This reasonably protects the right of both contents purchasers and copyright holders.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
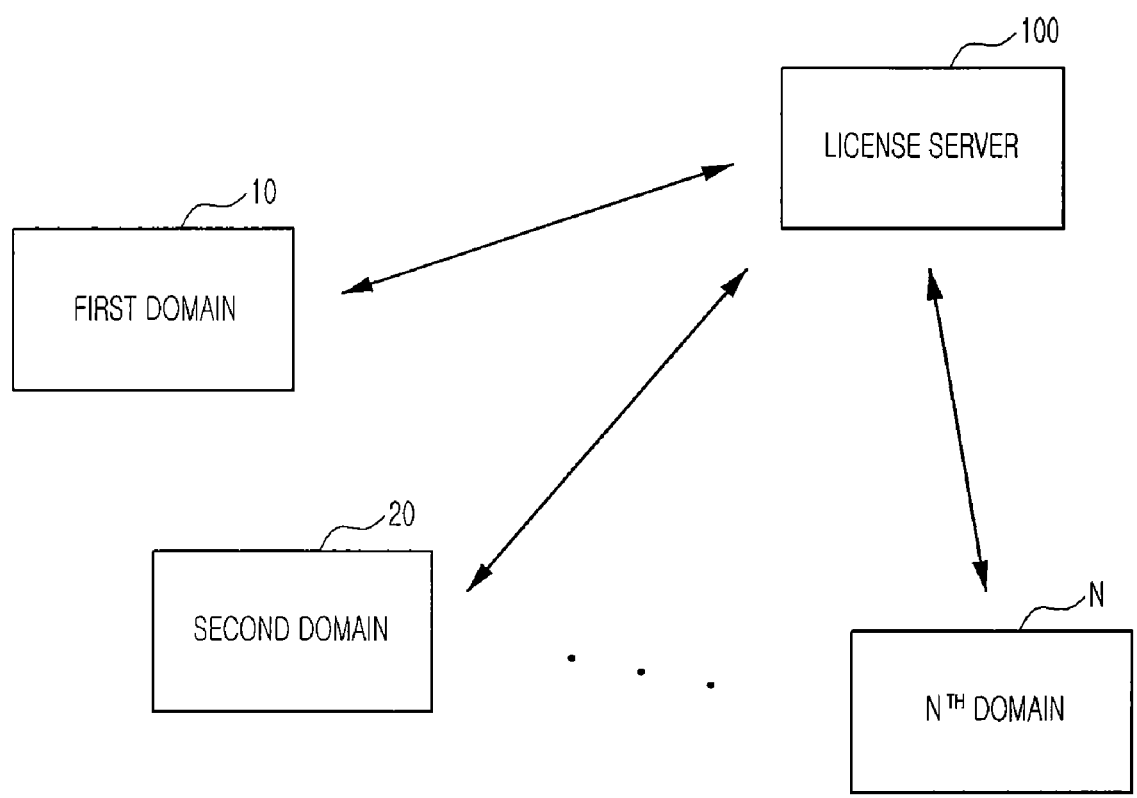
FIG. 1 shows the schematic construction of a domain DRM system according to the present invention.

Hereinafter, an exemplary embodiment of the present invention will be described with reference to the accompanying drawings. In the following description and drawings, the same reference numerals are used to designate the same or similar components, and so repetition of the description on the same or similar components will be omitted.

FIG. 1 shows the schematic construction of a domain DRM system according to the present invention.

Referring to FIG. 1, the domain DRM system according to the present invention includes a plurality of domains, particularly a first domain 10, a second domain 20, . . . , and an $N^{th}$ domain N, and a license server 100 for providing a domain (e.g. first domain 10) with a shard license, which can be freely shared only between user modules belonging to the same domain.

The detailed construction of the license server 100 and the first domain 10 in the domain DRM system according to the present invention will now be described with reference to FIG. 2.

Figure 2:
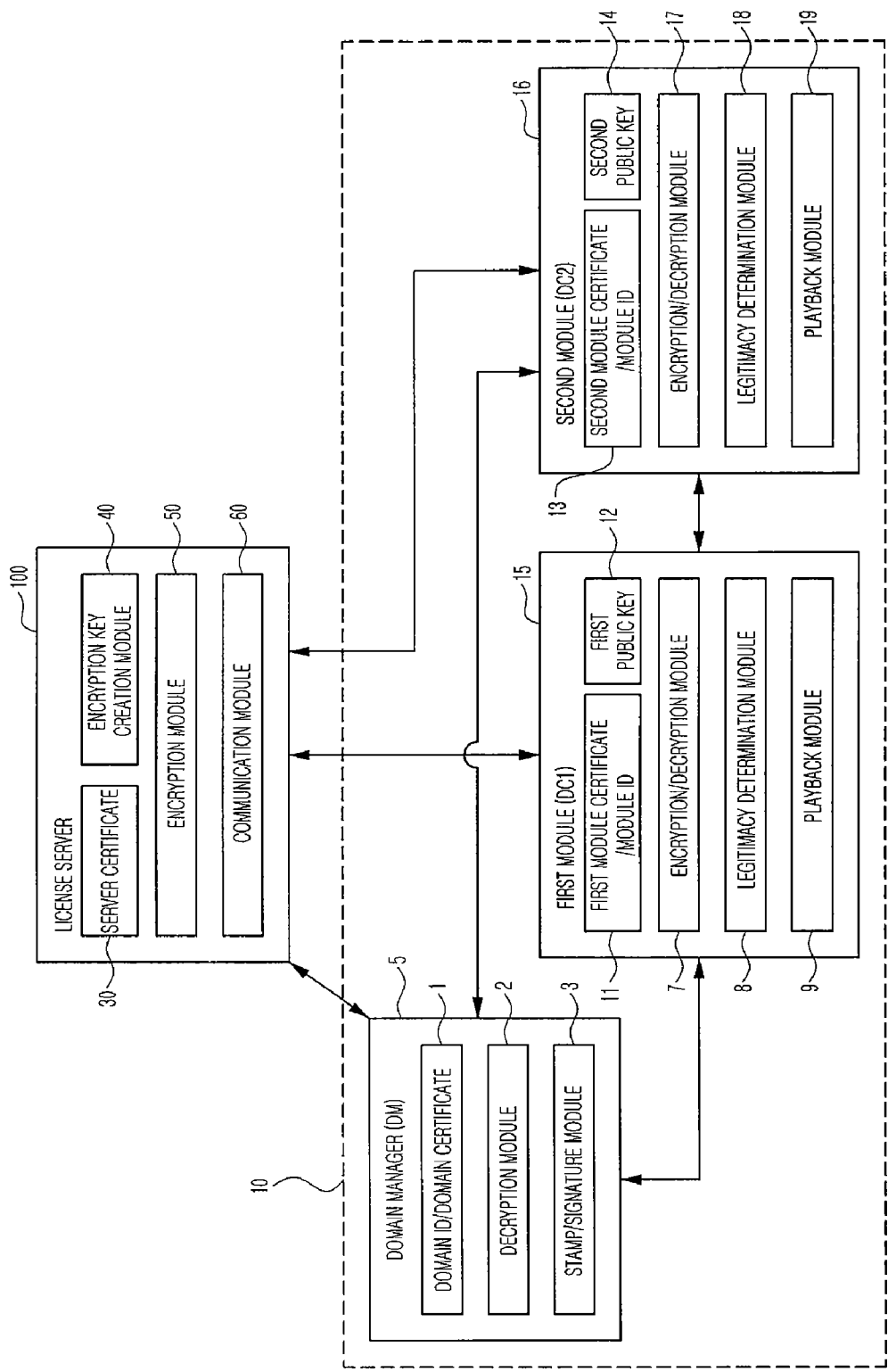
FIG. 2 is a control block diagram showing the detailed construction of a license server and a domain in the domain DRM system according to the present invention.

Referring to FIG. 2, the domain 10 includes a domain manager 5 and at least one user module. It will be assumed for convenience of description that the domain 10 includes first and second modules 15 and 16 as the user modules.

As used herein, a domain refers to a network of user modules (e.g. PCs, PDAs, DVD players) capable of playing contents, such as a home network. The first and second modules 15 and 16 may be any type of device capable of playing contents, including PCs, PDAs, and DVD players.

The domain manager 5 is created concurrently with the creation of the domain 10 (e.g. home network or office network) to conduct a management function. It can be said that, if the domain 10 is a home network, for example, the domain manager 5 is a gateway.

The domain manager 5 is given a domain ID/domain certificate 1, which includes the domain ID and domain certificate of the domain 10. As used herein, the domain certificate refers to a certificate used to confirm if the domain manager 5 is a module authorized to communicate with other modules. Such a domain certificate is given at the time of communication between modules as generally known in the art, and detailed description thereof will be omitted herein. The domain ID/domain certificate 1 may further include the domain public key of the domain manager 5.

The domain manager 5 also includes a decryption module 2 for decrypting a shared license DL, which is provided by the license server 100 or a user module (first or second module 15 or 16) belonging to the domain 10, by using a predetermined encryption key (hereinafter, referred to as a domain encryption key $K_{DM}$). As will be described later in more detail, the domain encryption key is created by the license server 100 and is given to the domain manager 5.

The domain manager 5 then decrypts the shared license by using the domain encryption key $K_{DM}$, and provides the corresponding user module (e.g. first module 15) with it.

The domain manager 5 may further include a stamp/signature module 3 for concatenating the shared license DL, which has been decrypted by the decryption module 2, with a time stamp Tn corresponding to the current time value to obtain a shared license CL, as well as electrically signing a hash value H(CL), which has been obtained by hashing the shared license CL, to create an electronic signature value S. In this case, the domain manager 5 decrypts the shared license DL by using its domain encryption key $K_{DM}$ and creates a shared license CL by concatenating the shared license DL with a time stamp Tn corresponding to the current time value, as well as an electronic signature value S by electrically signing a hash value obtained by hashing the shared license CL. The domain manager 5 then provides the corresponding user module (e.g. first module 15) with the shared license CL and the electronic signature value S.

For convenience of description, only the first module 15 will be referred to in the following description as a user module belonging to the domain 10.

The first module 15 includes a first module certificate/module ID 11, which includes its module ID and a first module certificate, and a first public key 12 allocated to the first module 15. As used herein, the first module certificate refers to a certificate used to confirm if the first manager 15 is a module authorized to communicate with other modules. Such a certificate is given at the time of communication between modules as generally known in the art, and detailed description thereof will be omitted herein.

The first module 15 also includes an encryption/decryption module 7 for decrypting or encrypting a shared license by using a predetermined encryption key (hereinafter, referred to as a first encryption key $K_{DC1}$), which is created by the license server 100 and given to the first module 15, as will be described later in more detail.

When the license server 100 provides the first module 15 with a shared license DL, the first module 15 provides the domain manager 5 with the shared license DL. When the domain manager 5 provides the first module 15 with a decrypted shared license, the first module 15 decrypts the encryption/decryption module 7 by using the first encryption key $K_{DC1}$.

The first module 15 may further include a legitimacy determination module 8 so that, when the domain manager 5 provides a shared license CL concatenated with a time stamp and an electronic signature value S, the legitimacy determination module 8 determines if the electronic signature value S corresponds to the domain manager 5, if the value obtained by hashing the shared license CL concatenated with a time stamp by using the domain public key of the domain manager 5 equals the electronically signed hash value, and if the difference between the value of the time stamp Tn and the current time is below a predetermined threshold. When the legitimacy determination module 8 determines that the electronic signature value S is a legitimate electronic signature corresponding to the domain manager 5, that the value obtained by hashing the shared license CL concatenated with a time stamp by using the domain public key of the domain manager 5 equals the electronically signed hash value, and that the difference between the value of the time stamp and the current time is below a predetermined threshold, the first module 15 can employ the encryption/decryption module 7 to remove the time stamp from the shared license CL and decrypt the shared license by using the first encryption key $K_{DC1}$.

The first module 15 includes a playback module 9 for playing contents. The first module 15 decrypts the provided contents from a packaging server (not shown) by using the decrypted shared license CL and plays the decrypted contents using the playback module 9.

The license server 100 includes its server certificate 30. The license server 100 also includes an encryption key creation module 40, an encryption module 50, and a communication module 60 as shown in FIG. 2. The license server 100 creates encryption keys, particularly a domain encryption key, a first encryption key, and a second encryption key, and provides the domain manager 5 and at least one user module (i.e. first and second modules 15 and 16) with the corresponding encryption keys. When a user module (e.g. first module 15) requests specific contents, the license server 100 encrypts the contents encryption key, which has been used to encrypt the contents, by using the encryption key (e.g. first encryption key) of the corresponding user module (e.g. first module 15) and the encryption key (e.g. domain encryption key) of the domain manager according to a commutative encryption scheme, and provides either the domain manager 5 or the corresponding user module (e.g. first module 15) with the encryption result, i.e. shared license.

The license server 100 will now be described in more detail. The communication module 60 of the license server 100 enables the license server 100 to communicate with respective domains 10, 20, . . . , N. Although not shown in FIG. 2, the user modules 15 and 16 inside the domain 10, as well as the domain manager 5, have communication modules, which correspond to the communication module 60 of the license server 100, so that they can communicate with the license server 100.

The encryption key creation module 40 of the license server 100 creates encryption keys (a domain encryption key $K_{DM}$, a first encryption key $K_{DC1}$, and a second encryption key $K_{DC2}$), which correspond to the domain manager 5 and at least one user module (first and second modules 15 and 16) belonging to the domain 10, respectively. In other words, the encryption key creation module 40 separately creates a domain encryption key $K_{DM}$ to be provided to the domain manager 5, a first encryption key $K_{DC1}$ to be provided to the first module 15, and a second encryption key $K_{DC2}$ to be provided to the second module 16.

Figure 3:
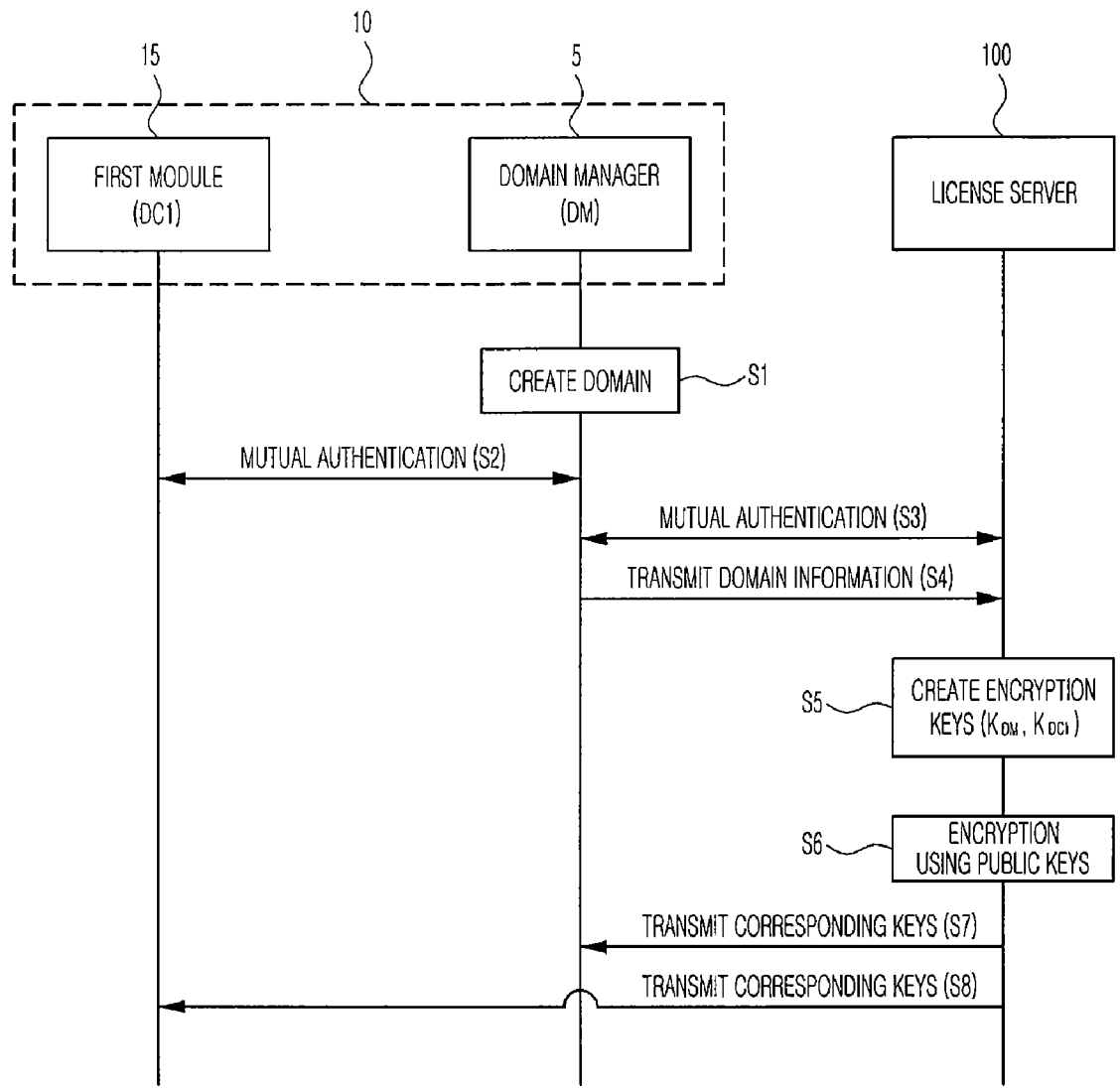
FIG. 3 is a control flowchart showing authentication occurring between the domain and the license server in the domain DRM system according to the present invention.

The license server 100 encrypts respective encryption keys (domain encryption key $K_{DM}$, first encryption key $K_{DC1}$, and second encryption key $K_{DC2}$), which have been created by the encryption key creation module 40, based on information regarding public keys (domain public key, first public key, and second public key) among domain information received from the domain manager 5 through a authentication procedure, which will be described later with reference to FIG. 3. In other words, the license server 100 encrypts the domain encryption key $K_{DM}$ by using the domain public key, encrypts the first encryption key $K_{DC1}$ by using the first public key, and encrypts the second encryption key $K_{DC2}$ by using the second public key. The license server 100 preferably adopts an RSA encryption scheme to encrypt the encryption keys by using the public keys.

The following notation may be used to represent the domain encryption key $K_{DM}$, the first encryption key $K_{DC1}$, and the second encryption key $K_{DC2}$, which have been encrypted as mentioned above.

$E_{PUB\_DM}(K_{DM})$: result of encrypting the domain encryption key $K_{DM}$ by using the domain public key $E_{PUB\_DC1}(K_{DC1})$: result of encrypting the first encryption key $K_{DC1}$ by using the first public key $E_{PUB\_DC2}(K_{DC2})$: result of encrypting the second encryption key $K_{DC2}$ by using the second public key The license server 100 provides the domain manager 5, the first module 15, and the second module 16 with the results of encrypting respective encryption keys (domain encryption key $K_{DM}$, first encryption key $K_{DC1}$, and second encryption key $K_{DC2}$), i.e. $E_{PUB\_DM}(K_{DM})$, $E_{PUB\_DM}(K_{DC1})$, and $E_{PUB\_DC2}(K_{DC2})$, respectively.

The domain manager 5 employs the decryption module 2 to decrypt the $E_{PUB\_DM}(K_{DM})$, which is provided by the license server 100, by using its domain public key and obtain the domain encryption key $K_{DM}$. The first and second modules 15 and 16 employ the encryption/decryption modules 7 and 17 to decrypt the $E_{PUB\_DC1}(K_{DC1})$ and $E_{PUB\_DC2}(K_{DC2})$, which are provided by the license server 100, by using their first and second public keys and obtain first and second encryption keys $K_{DC1}$ and $K_{DC2}$, respectively.

The encryption module 50 of the license server 100 encrypts a contents encryption key $K_C$, which has been used to encrypt specific contents, by using two different encryption keys according to the commutative encryption scheme. For example, when the license server 100 is to provide the first module 15 with a contents encryption key $K_C$, the encryption module 50 encrypts the contents encryption key $K_C$ by using a first encryption key $K_{DC1}$ and a domain encryption key $K_{DM}$, which have been created by the encryption key creation module 40 and which correspond to the first module 15 and the domain manager 5, respectively, according to the commutative encryption scheme. As a result of encrypting the contents encryption key $K_C$ by the encryption module 50 according to the commutative encryption scheme, a shared license DL according to the present invention is obtained.

The following formula describes how the shared license DL is encrypted by the encryption module 50 according to the commutative encryption scheme.

$$CE_{K1}(CE_{K2}(M))=CE_{K2}(CE_{K1}(M))$$

In the formula, $CE_K(M)$ refers to encryption of data M by an encryption key K, and $CE_{K1}(CE_{K2}(M))$ means that, after data m has been encrypted by an encryption key K2, it is again encrypted by an encryption key K1.

For example, if the license server 100 is to provide the first module 15 with a contents encryption key $K_C$, the encryption module 50 encrypts the contents encryption key Kc by using one of a first encryption key $K_{DC1}$ and a domain encryption key $K_{DM}$, which have been created by the encryption key creation module 40 and which correspond to the first module 15 and the domain manager 5, respectively, according to the commutative encryption scheme. Then, the encryption module 50 again encrypts the contents encryption key $K_C$ by using the other encryption key. The result of such encryption is a shared license $DL_1$, which can be $CE_{KDC1}(CE_{KDM}(K_C))$ or $CE_{KDM}(CE_{KDC1}(M))$.

When a user module (e.g. first module 15) in the domain 10 requests contents, a packaging server (not shown) provides the license server 100 with a contents encryption key $K_C$, which has been used to encrypt the contents. Although not shown in FIG. 2, when at least one (e.g. first module 15) of user modules in the domains 10, 20, ... , N requests contents to purchase them, the packaging server (not shown) encrypts the requested contents by using the contents encryption key $K_C$ and provides the corresponding user module (e.g. first module 15) with them. The construction of the packaging server in a DRM system is widely known in the art, and detailed description thereof will be omitted herein. As such, the packaging server (not shown) encrypts the requested contents by using the contents encryption key $K_C$ and provides the corresponding user module (e.g. first module 15) with them. In addition, the packaging server provides the license server 100 with the contents encryption key $K_C$, which has been used to encrypt the contents.

As such, when a user module (e.g. first module 15) in the domain 10 requests specific contents, the encryption module 50 of the license server 100 receives a contents encryption key $K_C$ from the packaging server (not shown) and encrypts the contents encryption key $K_C$ by using a first encryption key $K_{DC1}$ and a domain encryption key $K_{DM}$, which correspond to the first module 15 and the domain manager 5, respectively, according to the commutative encryption scheme. The license server 100 then provides the domain manager 5 or the first module 15 with the result of encryption, i.e. shared license $DL_1$, through the communication module 60.

Operations for authentication between each user module in the domain 10 and the domain manager 5, as well as authentication between the domain manager 5 and the license server 100 will now be described with reference to FIG. 3. It will be assumed for convenience of description that the authentication occurs between the domain manager 5 and the first module 15 in the domain 10.

First, a domain 10 is created (S1). More particularly, a domain manager 5 having a management function is created, and a network of user modules managed by the domain manager 5 is constructed. Such construction of a network is widely known in the art, and detailed description of the step for creating a domain 10 will be omitted herein.

After the domain 10 is created, a new user module, e.g. a first module 15 is added to the domain 10 in the following manner: in order to register the first module 15 in the domain 10, it must be registered in the domain manager 5. To this end, the first module 15 transmits its module ID and first module certificate, which are stored in the first module certificate/module ID 11, as well as its first public key (allocated to it in advance) to the domain manager 5. Then, the domain manager 5 transmits its domain certificate, which is stored in the domain ID/domain certificate 1, and its domain public key (allocated to it in advance) to the first module 15. In this manner, the first module 15 and the domain manager 5 authenticate each other (S2). The first module 15 is thus registered in the domain 10.

The domain 10, which has been created in this manner, needs to be registered in the license server 100. To this end, the domain manager 5 provides the license server 100 with its domain certificate to request registration. In response, the license server 100 provides the domain manager 5 with its server certificate for mutual authentication (S3). After the authentication is over, the domain manager 5 provides the license server 100 with domain information including the domain ID of the domain 10, a user module list enumerating the module ID of at least user module (first and second modules 15 and 16) belonging to the domain 10, the public key (first and second public keys) of each user module, and the domain public key of the domain manager 5 (S4).

Then, the license server 100 employs the encryption key creation module 40 to create encryption keys (a domain encryption key $K_{DM}$, a first encryption key $K_{DC1}$, and a second encryption key $K_{DC2}$) corresponding to the domain manager 5, the first module 15, and the second module 16, respectively (S5). The license server 100 encrypts respective encryption keys (domain encryption key $K_{DM}$, first encryption key $K_{DC1}$, and second encryption key $K_{DC2}$) based on information regarding the public keys (domain public key, first public key, and second public key) among the received domain information (S6). In other words, the license server 100 encrypts the domain encryption key $K_{DM}$ by using the domain public key, and encrypts the first encryption key $K_{DC1}$ by using the first public key. The license server 100 provides the domain manager 5 and the first module 15 with the results of encryption in step S6, i.e. $E_{PUB\_DM}(K_{DM})$ and $E_{PUB\_DC1}(K_{DC1})$, respectively. More particularly, the license server 100 provides the first module 15 with the result of encrypting the first encryption key $K_{DC1}$ by using the first public key, i.e. $E_{PUB\_DC1}(K_{DC1})$ (S7), and provides the domain manager 5 with the result of encrypting the domain encryption key $K_{DM}$ by using the domain public key, i.e. $E_{PUB\_DM}(K_{DM})$ (S8). The decryption module 2 of the domain manager 5 decrypts the $E_{PUB\_DM}(K_{DM})$, which is provided by the license server 100, by using the domain public key, and the domain manager 5 obtains the domain encryption key $K_{DM}$. The encryption/decryption module 7 of the first module 15 decrypts the $E_{PUB\_DC1}(K_{DC1})$, which is provided by the license server 100, by using its first public key, and the first module 15 obtains the first encryption key $K_{DC1}$.

As is clear from the above description, according to the domain DRM system and the method for sharing licenses for domain DRM systems according to the present invention, each user module in the domain 10 and the domain manager 5 authenticate each other, and the domain manager 5 and the license server 100 authenticate each other. Respective encryption keys created by the license server 100 are provided to the domain manager 5 and each user module in the domain 10.

Figure 4:
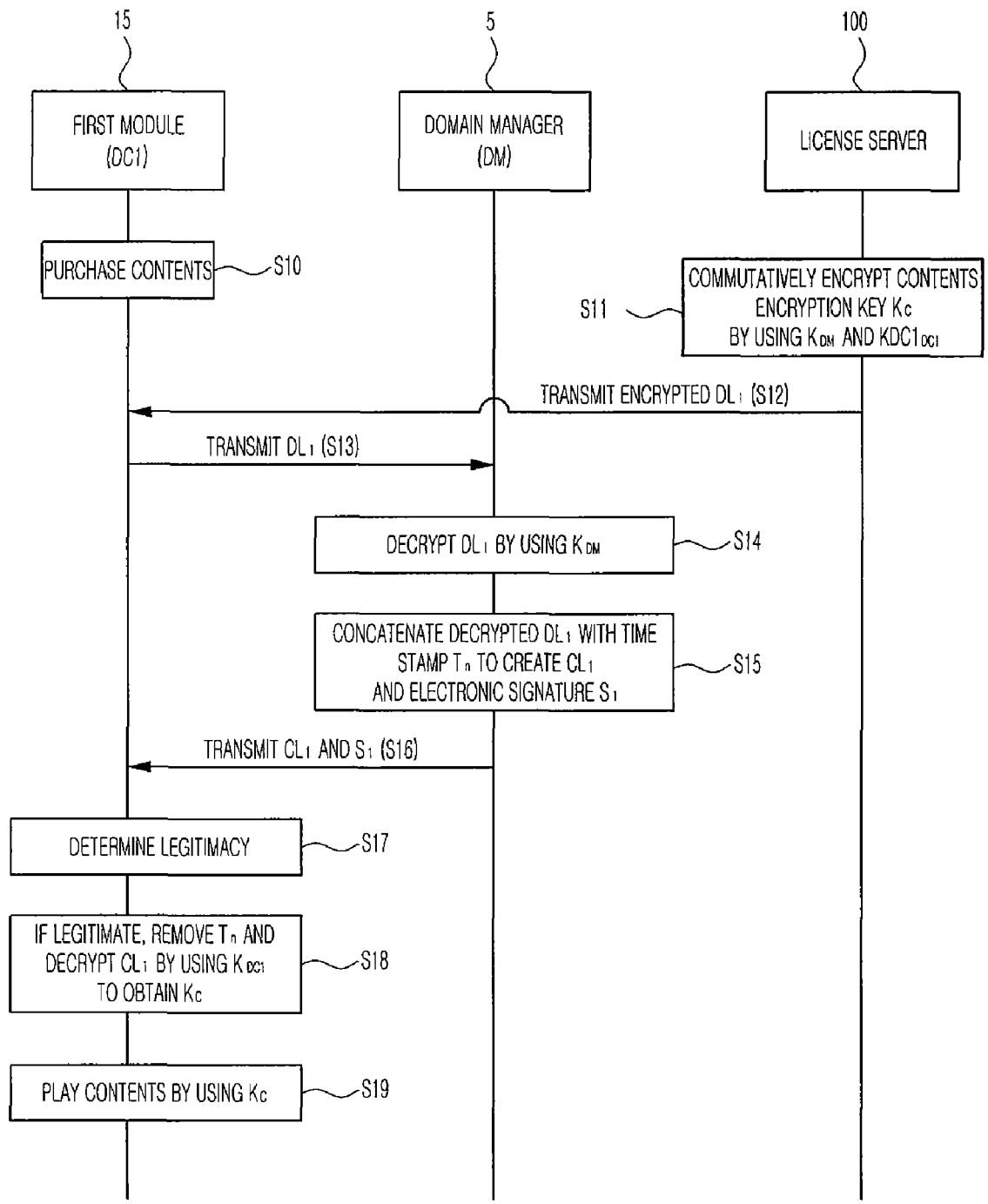
FIG. 4 is a control flowchart showing a procedure for providing the domain with a shared license in response to a contents request so that the contents can be played in the domain DRM system according to the present invention.

A procedure for providing the domain with a shared license in response to a contents request so that the contents can be played in the domain DRM system according to the present invention will now be described with reference to FIG. 4.

When a user module (e.g. first module 15) in the domain 10 purchases contents (S10), the first module 15 requests the packaging server (not shown) to provide the contents. Then, the packaging server (not shown) provides the license server 100 with a contents encryption key $K_C$, which has been used to encrypt the contents. The license server 100 encrypts the contents encryption key $K_C$ by using a first encryption key $K_{DC1}$, and a domain encryption key $K_{DM}$, which correspond to the first module 15 and the domain manager 5, respectively, according to the commutative encryption scheme (S11).

The license server 100 provides the first module 15 with the result of encryption in step S11, i.e. shared license $CE_{KDC1}(CE_{KDM}(K_C))=CE_{KDM}(CE_{KDC1}(K_C)=DL_1$ (S12). After receiving the shared license $DL_1$, the first module 15 provides the domain manager 5 with the shared license $DL_1$ (S13).

After receiving the shared license $DL_1$, the decryption module 2 of the domain manager 5 decrypts the shared license $DL_1$ by using the domain encryption key $K_{DM}$ (S14). The domain manager 5 concatenates the decrypted shared license $CE_{KDM}(DL_1)=CE_{KDC1}(K_C)$ with a time stamp Tn, which corresponds to the current time value, to create a shared license $CL_1=CE_{KDM}^-(DL_1)\|Tn=CE_{KDC1}(K_C)\|Tn$. In addition, the domain manager 5 hashes the shared license $CL_1$, which has been concatenated with a time stamp, and electronically signs the resulting hash value $H(CL_1)$ so that an electronic signature value $S_1=DS_{DM}H(CL_1)$ is created (S15). The domain manager 5 provides the first module 15 with the shared license $CL_1$ and the electronic signature value $S_1$ (S16).

After receiving the shared license $CL_1$ concatenated with a time stamp and the electronic signature value $S_1$, the legitimacy determination module 8 of the first module 15 determines the legitimacy by determining if the electronic signature value $S_1=DS_{DM}H(CL_1)$ corresponds to the domain manager 5, if the value obtained by hashing the shared license $CL_1$ concatenated with a time stamp by using the domain public key of the domain manager 5 equals the electronically signed hash value $H(CL_1)$, and if the difference between the value of the time stamp and the current time is below a predetermined threshold (S17). When the legitimacy is verified, i.e. when the legitimacy determination module 8 determines that the electronic signature value $S_1=DS_{DM}H(CL_1)$ corresponds to the domain manager 5, that the value obtained by hashing the shared license $CL_1$, concatenated with a time stamp by using the domain public key of the domain manager 5 equals the electronically signed hash value $H(CL_1)$, and that the difference between the value of the time stamp and the current time is below a predetermined threshold, the first module 15 removes the time stamp from the shared license $CL_1$ and decrypts the shared license $CE_{KDC1}(K_C)$ by using the first encryption key $K_{DC1}$ (S18). As a result, the first module 15 obtains the contents encryption key $CE_{KDC1}(CE_{KDC1}(K_C))=K_C$, which can be used to decrypt the encrypted contents, which are provided by the packaging server (not shown), and play them using playback module 9 (S19).

Figure 5:
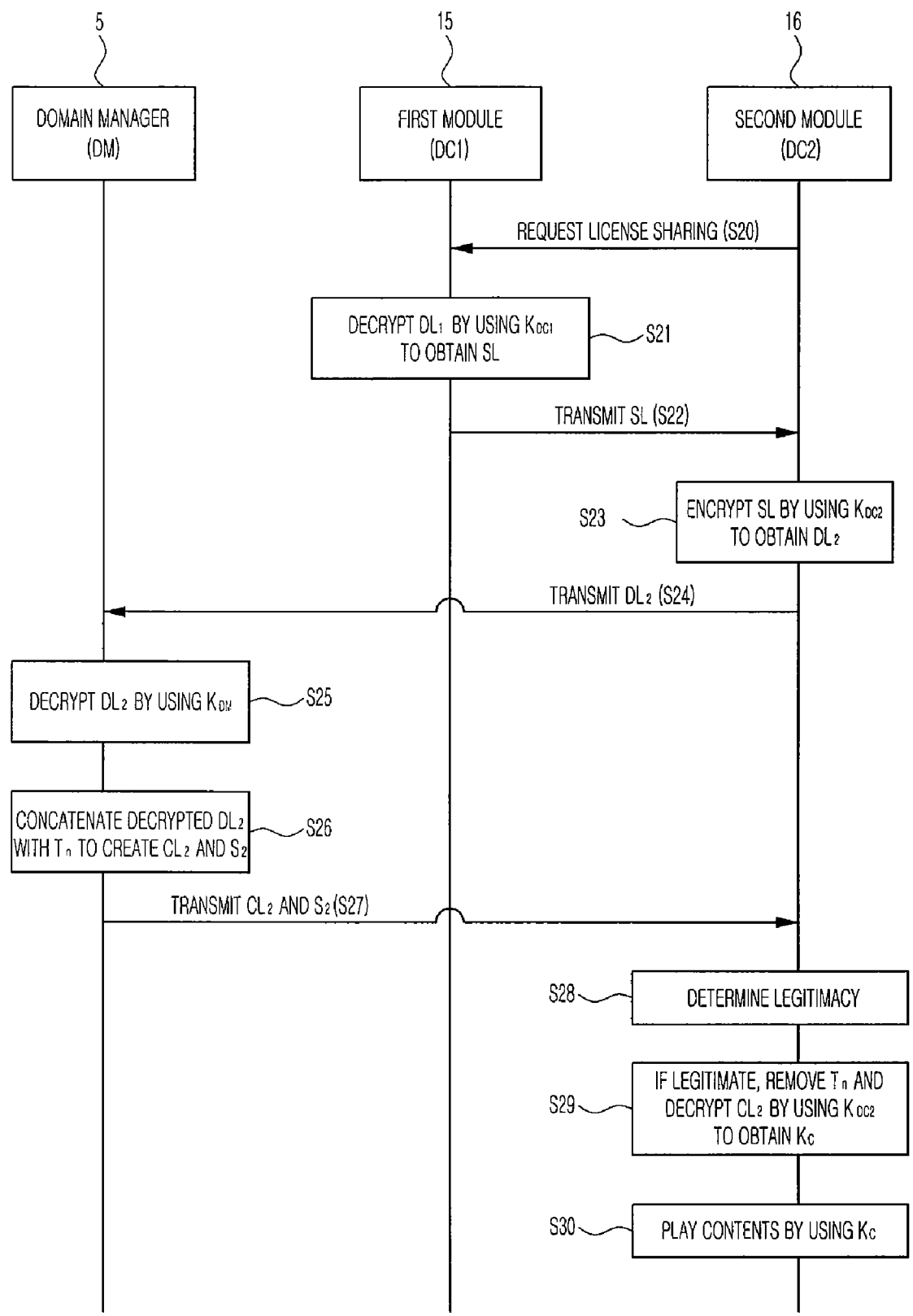
FIG. 5 is a control flowchart showing a procedure for sharing a shared license with other user modules within the domain in the domain DRM system according to the present invention.

A procedure for sharing a shared license DL with other user modules within the domain 10 in the domain DRM system according to the present invention will now be described with reference to FIG. 5.

The same condition as has been described with reference to FIG. 4 will be assumed. In other words, it will be assumed that the first module 15 has purchased contents and received encrypted contents, that the license server 100 has provided a shared license $DL_1$, which has been decrypted by the domain manager 5 and then by the first module 15, and that the first module 15 is playing the contents by using the obtained contents encryption key $K_C$.

If the second module 16 in the domain 10 requests that the shared license $DL_1$ be shared (S20), the first module 15 decrypts the shared license $DL_1$ by using the first encryption key $K_{DC1}$ (S21). Then, the first module 15 provides the second module 16 with the decrypted shared license $CE_{KDC1}^-(DL_1)=CE_{KDC1}^-(CE_{KDC1}(CE_{KDM}(K_C)))=CE_{KDM}(K_C)=SL$ (S22).

The encryption/decryption module 17 of the second module 16 encrypts the decrypted shared license SL, which has been provided by the first module 15, by using the second encryption key $K_{DC2}$ (S23). The second module 16 provides the domain manager 5 with the encrypted shared license $CE_{KDC2}(CE_{KDM}(K_C))=DL_2$ (S24).

The decryption module 2 of the domain manager 5 decrypts the shared license $DL_2$ by using the domain encryption key $K_{DM}$ (S25). The domain manager 5 concatenates the decrypted shared license $CE_{KDM}^-(DL_2)=CE_{KDM}^-(CE_{KDC2}(CE_{KDM}(K_C))=CE_{KDC2}(K_C)$ with a time stamp Tn, which corresponds to the current time value, to create a shared license $CL_2=CE_{KDM}^-(DL_2)\|Tn=CE_{KDC2}(K_C)\|Tn$. In addition, the domain manager 5 hashes the shared license $CL_2$, which has been concatenated with a time stamp, and electronically signs the resulting hash value $H(CL_2)$ so that an electronic signature value $S_2=DS_{DM}H(CL_2)$ is created (S26). The domain manager 5 provides the second module 16 with the shared license $CL_2$ and the electronic signature value $S_2$ (S27).

After receiving the shared license $CL_2$ concatenated with a time stamp and the electronic signature value $S_2$, the legitimacy determination module 18 of the second module 16 determines the legitimacy by determining if the electronic signature value $S_2=DS_{DM}H(CL_2)$ corresponds to the domain manager 5, if the value obtained by hashing the shared license $CL_2$ concatenated with a time stamp by using the domain public key of the domain manager 5 equals the electronically signed hash value $H(CL_2)$, and if the difference between the value of the time stamp and the current time is below a predetermined threshold (S28). When the legitimacy is verified, i.e. when the legitimacy determination module 18 determines that the electronic signature value $S_2=DS_{DM}H(CL_2)$ corresponds to the domain manager 5, that the value obtained by hashing the shared license $CL_2$ concatenated with a time stamp by using the domain public key of the domain manager 5 equals the electronically signed hash value $H(CL_2)$, and that the difference between the value of the time stamp and the current time is below a predetermined threshold, the second module 16 removes the time stamp from the shared license $CL_2$ and decrypts the shared license $CE_{KDC2}(K_C)$ by using the second encryption key $K_{DC2}$ (S29). As a result, the second module 16 obtains the contents encryption key $CE_{KDC2}^-(CE_{KDC2}(K_C))=K_C$, which can be used to decrypt the encrypted contents and play them using playback module 19 (S30).

As mentioned above, according to the inventive domain DRM system and the method for sharing a license for the domain DRM system, respective encryption keys are allocated to the domain manager 5 and respective user modules 15 and 16 in the domain 10. When the contents encryption key $K_C$ needs to be provided to a specific user module (e.g. first module 15) in the domain 10, the contents encryption key $K_C$ is encrypted twice, i.e. by the encryption key of the first module 15 and then by the encryption key of the domain manager 5 according to the commutative encryption scheme, and the resulting shared license is provided to the domain 10.

The provided shared license is decrypted by the domain manager 5 and then decrypted by the first module 15 to obtain the contents encryption key $K_C$ and play the contents. If another user module (e.g. second module 16) in the domain 10 requests the shared license, the first and second modules 15 and 16 and the domain manager 5 go through encryption/decryption by using their encryption keys so that the second module 16 can obtain the shared license, i.e. the contents encryption key $K_C$, and play the contents.

As such, according to the inventive domain DRM system and the method for sharing a license for the domain DRM system, the shared license is encrypted twice according to the commutative encryption scheme, and is freely shared between user modules in the domain. This means that purchased contents can be freely used between the user modules in the domain within the boundary of personal copying. In other words, the present invention has solved the problem of conventional DRM technology, which excessively limits the right of contents purchasers and which focuses on protecting the right of copyright holders, so that the right of both contents purchasers and copyright holders can be protected reasonably.

In addition, when a user module moves away from the domain, the free use of contents, which has been allowed in the domain, is limited. Furthermore, according to the present invention, no resources are wasted to maintain a certificate revocation mechanism, which is necessary for user modules to unsubscribe, in contrast to conventional AD DRM technology.

The present invention employs a time stamp and an electronic signature for safe license sharing. This guarantees safety against replay attacks.

The present invention has industrial applicability for the following reasons: a shared license is encrypted twice according to the commutative encryption scheme and is freely shared between user modules in the domain so that purchased contents can be freely used between user modules in the domain within the boundary of personal copying. This reasonably protects the right of both contents purchasers and copyright holders. Unlike conventional AD DRM technology, no resources are wasted to maintain a certificate revocation mechanism, which is necessary for user modules to unsubscribe. The present invention employs a time stamp and an electronic signature to guarantee safety against replay attacks. Application of the inventive domain DRM system and the method for sharing a license for the domain DRM system is expected to bring a substantial improvement in the DRM technology field, and the system and method can be easily implemented for various license-based contents markets.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A domain digital rights management (DRM) system comprising:

at least one user device including a hardware processor and at least one domain manager device including another hardware processor belonging to a domain; and a license server for creating domain encryption keys corresponding to the at least one domain manager device and the at least one user device, respectively, and providing the at least one domain manager device and the at least one user device with the respective domain encryption keys;

wherein when the at least one user device requests to reproduce contents encrypted by a contents encryption key:
 a) the license server encrypts the contents encryption key with one of the respective domain encryption keys and then encrypts the encrypted contents encryption key with another of the respective domain encryption keys to produce a double encrypted contents encryption key according to a commutative encryption scheme, and
 b) the license server transmits the double encrypted contents encryption key to both the user device and the at least one domain manager device which enables the at least one domain manager device and the at least one user device to decrypt the double encrypted contents encryption key by using both of the respective domain encryption keys, and decrypt the encrypted contents using the contents encryption key.

2. The domain DRM system as claimed in claim 1, wherein the license server is adapted to provide the at least one domain manager device with a server certificate for mutual authentication between the at least one domain manager device and the license server, when the at least one domain manager device provides the license server with a domain certificate in response to a registration request of the at least one domain manager device.

3. The domain DRM system as claimed in claim 2, wherein the at least one domain manager device is adapted to provide the license server with at least one domain information selected from the group consisting of a domain ID of the domain, the domain manager device belonging to the domain, a user device list enumerating a device ID of the at least one user device belonging to the domain, a public key of the at least one user device, and a public key of the domain manager device when the mutual authentication is completed.

4. The domain DRM system as claimed in claim 3, wherein the at least one user device is adapted to transmit the device ID of the at least one user device, the public key allocated to the at least one user device in advance, and a device certificate of the at least one user device to the at least one domain manager device so that the user device is registered in the domain, the at least one domain manager device belonging to the domain.

5. The domain DRM system as claimed in claim 3, wherein the license server is adapted to create encryption keys corresponding to the at least one domain manager device and at least one user device, respectively, encrypt the encryption keys corresponding to the at least one domain manager device and the at least one user device by using corresponding public keys, respectively, and provide the at least one domain manager device and at least one user device with the corresponding encrypted encryption keys, respectively.

6. The domain DRM system as claimed in claim 1, wherein the license server is configured to:
 create and provide an encryption key corresponding to a first device of the at least one user device; and
 encrypt the contents encryption key used to encrypt contents requested by the first device of the at least one user device by using the encryption keys corresponding to the first device and the at least one domain manager device, respectively, according to the commutative encryption scheme.

7. The domain DRM system as claimed in claim 6, wherein the shared license is encrypted by the license server according to the commutative encryption scheme as defined by equation $$CE_{K1}(CE_{K2}(M))=CE_{K2}(CE_{K1}(M))$$

wherein, $CE_K(M)$ refers to encryption of data M by an encryption key K, and $CE_{K1}(CE_{K2}(M))$ means that the data M is encrypted by an encryption key K2 and is again encrypted by an encryption key K1.

8. The domain DRM system as claimed in claim 7, wherein the first device is adapted to provide the at least one domain manager device with the shared license when the license server provides the first device with the shared license.

9. The domain DRM system as claimed in claim 7, wherein the at least one domain manager device is configured to:
 decrypt the shared license by using the encryption key provided to the domain manager device by the license server, when the at least one domain manager device is provided with the shared license, so that the first device is provided with the decrypted shared license.

10. The domain DRM system as claimed in claim 9, wherein the first device is configured to:
 decrypt the decrypted shared license by using the encryption key provided to the first device by the license server, when the at least one domain manager device provides the first device with the decrypted shared license, so that the contents encryption key used to encrypt the contents can be obtained from the shared license.

11. The domain DRM system as claimed in claim 7, wherein the first device is configured to:
 decrypt the shared license provided by the license server by using the encryption key provided to the first device by the license server and provide a second device of the at least one user device with the decrypted shared license, when the second device in the domain requests that the shared license be shared.

12. The domain DRM system as claimed in claim 11, wherein the second device is configured to:
 encrypt the decrypted shared license by using an encryption key provided to the second device by the license server and provide the at least one domain manager device with the encrypted shared license, when the first device provides the second device with the decrypted shared license.

13. The domain DRM system as claimed in claim 9, wherein the at least one domain manager device is configured to:
 create a shared license concatenated with a time stamp by concatenating the shared license decrypted by the at least one domain manager device with a time stamp corresponding a current time value,
 create an electronic signature value by hashing the shared license concatenated with the time stamp and electronically signing a resulting hash value, and
 provide the first device with the shared license concatenated with the time stamp and the electronic signature value.

14. The domain DRM system as claimed in claim 13, wherein the first device is configured to:
 determine when the electronic signature value corresponds to the at least one domain manager device,
 when a value obtained by hashing the shared license concatenated with the time stamp by using the public key of the at least one domain manager device equals the electronically signed hash value, and when a difference between a value of the time stamp and current time is below a predetermined threshold, when the at least one domain manager device provides the first device with the shared license concatenated with the time stamp and the electronic signature value.

15. The domain DRM system as claimed in claim 14, wherein the first device is configured to:
   remove the time stamp from the shared license concatenated with the time stamp
   decrypt the shared license by using the encryption key provided by the license server, and
   obtain the contents encryption key from the shared license, when it is determined that the electronic signature value corresponds to the at least one domain manager device, that the value obtained by hashing the shared license concatenated with the time stamp by using the public key of the domain manager device equals the electronically signed hash value, and that the difference between the value of the time stamp and current time is below the predetermined threshold.

16. A method for sharing a license for a domain DRM system, the method comprising the steps of:
   creating, by a license server, respective domain encryption keys corresponding to a domain manager device including a hardware processor and at least one user device including another hardware processor belonging to a domain, and providing the domain manager device and the at least one user device with the respective domain encryption keys;
   receiving, by the license server, a request to reproduce contents that are encrypted by a contents encryption key from a first device of the at least one user device,
   encrypting the contents encryption key with one of the respective domain encryption keys, and then encrypting the encrypted contents encryption key with another one of the respective domain encryption keys to produce a double encrypted contents encryption key according to a commutative encryption scheme in response to the request; and
   providing, by the license server, the double encrypted contents encryption key to both the domain manager device and the first device, which enables the domain manager device and the first device to decrypt the double encrypted contents encryption key by using both of the respective domain encryption keys, and decrypt the encrypted contents using the contents encryption key.

17. The method as claimed in claim 16, further comprising a step of providing the domain manager device with a server certificate of the license server for mutual authentication between the domain manager device and the license server, when the domain manager device provides the license server with a domain certificate in response to a registration request of the domain manager device.

18. The method as claimed in claim 17, further comprising a step of providing the license server with at least one domain information selected from the group consisting of a domain ID of the domain, the domain manager device belonging to the domain, a user device list enumerating a device ID of the at least one user device belonging to the domain, a public key of the at least one user device, and a public key of the domain manager device when the mutual authentication is completed.

19. The method as claimed in claim 18, further comprising a step of transmitting the device ID of at least one user device, the public key allocated to the user device in advance, and a device certificate of the at least one user device to the domain manager device by the at least one user device so that the at least one user device is registered in the domain, the domain manager device belonging to the domain.

20. The method as claimed in claim 19, wherein the step of creating and providing respective encryption keys comprises the steps of:
   creating encryption keys corresponding to the domain manager device and the at least one user device, respectively;
   encrypting the encryption keys corresponding to the domain manager device and the at least one user device, respectively, by using corresponding public keys; and
   providing the domain manager device and the at least one user device with the corresponding encrypted encryption keys, respectively.

21. The method as claimed in claim 16, wherein the shared license is encrypted according to the commutative encryption scheme as defined by equation $$CE_{K1}(CE_{K2}(M))=CE_{K2}(CE_{K1}(M))$$

wherein, $CE_K(M)$ refers to encryption of data M by an encryption key K, and $CE_{K1}(CE_{K2}(M))$ means that the data M is encrypted by an encryption key K2 and is again encrypted by an encryption key K1.

22. The method as claimed in claim 21, further comprising a step of providing the domain manager device with the shared license by the first device when the license server provides the shared license.

23. The method as claimed in claim 22, further comprising a step of decrypting the shared license by using the respective domain encryption key provided to the first device by the license server, when the shared license is provided, and providing the first device with the decrypted shared license by the domain manager device.

24. The method as claimed in claim 23, further comprising a step of decrypting the decrypted shared license by using the respective domain encryption key provided to the domain manager device by the license server, when the domain manager device provides the decrypted shared license, and obtaining the contents encryption key by the first device.

25. The method as claimed in claim 21, further comprising a step of decrypting the shard license by using the respective domain encryption key provided to the first device by the license server, when a second device of the at least one user device in the domain requests that the shared license be shared, and providing the second device with the decrypted shared license by the first device.

26. The method as claimed in claim 25, further comprising a step of encrypting the decrypted shared license by using another respective domain encryption key provided to the second device by the license server, when the first device provides the decrypted shared license, and providing the domain manager device with the encrypted shared license by the second device.

27. The method as claimed in claim 24, wherein the step of providing the first device with the decrypted shared license comprises the steps of:
   decrypting the shared license by using the respective domain encryption key provided by the license server to the domain manager device;
   concatenating the decrypted shared license with a time stamp corresponding to a current time value;
   creating an electronic signature value by hashing the shared license concatenated with the time stamp and electronically signing a resulting hash value; and
   providing the first device with the shared license concatenated with the time stamp and the electronic signature value.

28. The method as claimed in claim 27, wherein the step of decrypting the shared license by the first device comprises the steps of:

determining when the electronic signature value corresponds to the domain manager device, when a value obtained by hashing the shared license concatenated with the time stamp by using a public key of the domain manager device equals the electronically signed hash value, and when a difference between a value of the time stamp and current time is below a predetermined threshold, when the shared license concatenated with the time stamp and the electronic signature value are provided;

removing the time stamp from the shared license concatenated with the time stamp when it is determined that the electronic signature value corresponds to the domain manager device, that the value obtained by hashing the shared license concatenated with the time stamp by using the public key of the domain manager device equals the electronically signed hash value, and that the difference between the value of the time stamp and current time is below the predetermined threshold; and decrypting the shared license by using the respective domain encryption key provided by the license server to the first device.

29. A license server comprising:

a hardware processor configured to:

create respective domain encryption keys corresponding to a domain manager device and at least one user device belonging to a domain, and providing the respective domain encryption keys to the domain manager device and the at least one user device;

encrypt a contents encryption key with one of the respective domain encryption keys, and then encrypting the encrypted contents encryption key with another one of the respective domain encryption keys to produce a double encrypted contents encryption key according to a commutative encryption scheme; and transmit the double encrypted contents encryption key to both the domain manager device and the at least one user device, which enables the domain manager device and the at least one user device to decrypt the double encrypted contents encryption key by using both of the respective domain encryption keys, and decrypt encrypted contents using the contents encryption key.

30. The license server as claimed in claim 29, wherein the shared license is encrypted according to the commutative encryption scheme as defined by equation $$CE_{K1}(CE_{K2}(M))=CE_{K2}(CE_{K1}(M))$$

wherein, $CE_K(M)$ refers to encryption of data M by an encryption key K, and $CE_{K1}(CE_{K2}(M))$ means that the data M is encrypted by an encryption key K2 and is again encrypted by an encryption key K1.

* * * * *